United States Patent Office 2,814,903
Patented Dec. 3, 1957

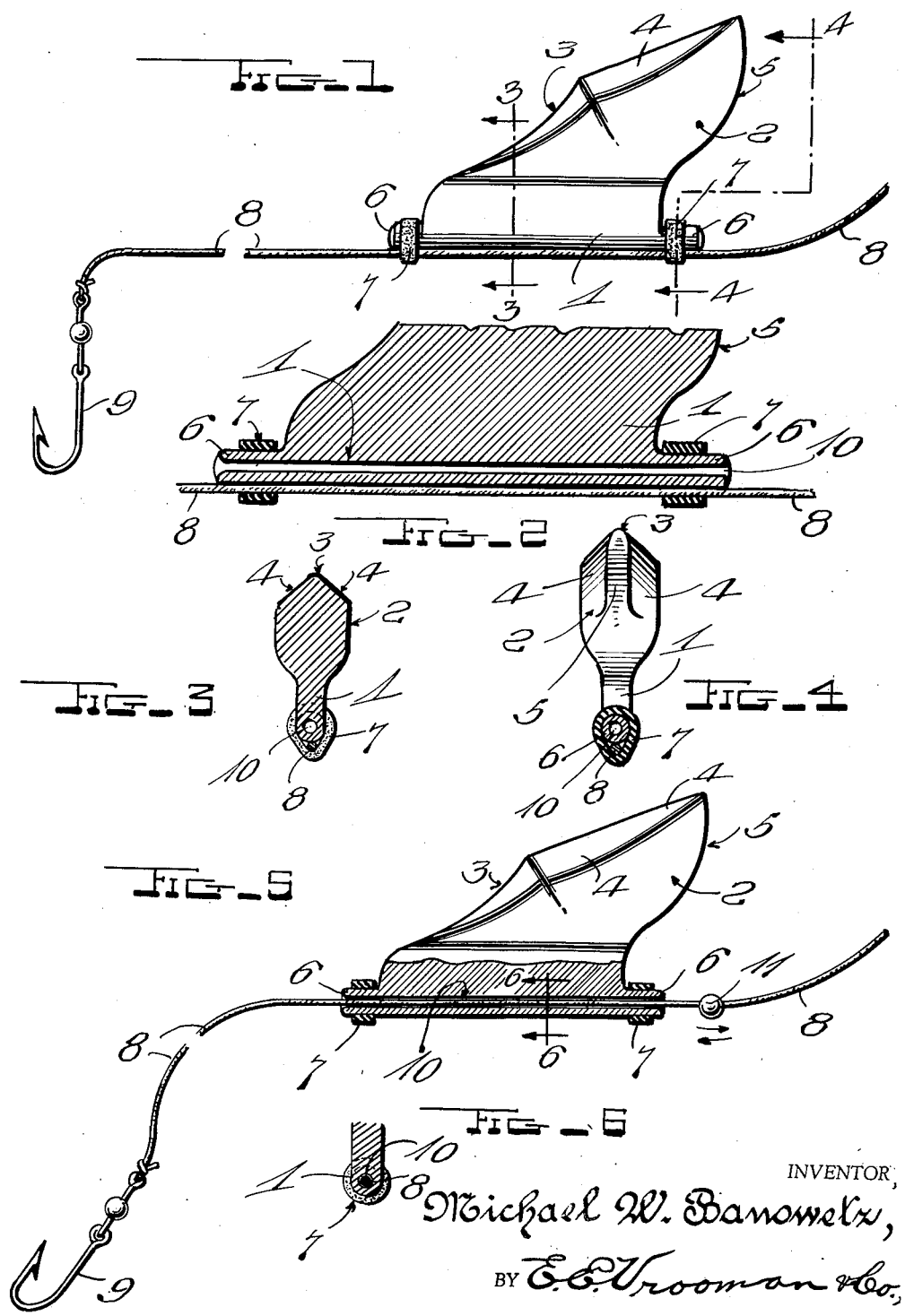

2,814,903
FISHLINE FLOAT

Michael W. Banowetz, New Orleans, La., assignor to Master Industries, Inc., a corporation of Louisiana Application December 20, 1954, Serial No. 476,303

1 Claim. (Cl. 43—43.13)

This invention relates to a fishline float.

An object of the invention is the provision of an efficient and durable device for still fishing, which will always be visible to the operator prior to the hooking of a fish.

Another object of the invention is the provision of an efficient float that can be used for casting, when the operator desires.

A still further object of the invention is the construction of an efficient float which will prevent the fishing line from twisting during the operation of fishing.

With the foregoing and other objects in view, this invention comprises certain novel constructions, combinations, and arrangements of parts as will be hereinafter fully described, illustrated in the accompanying drawings, and more particularly pointed out in the appended claim.

In Fig. 1 there is shown a view in side elevation, of a fishline float, constructed in accordance with the present invention.

Fig. 2 is an enlarged fragmentary longitudinal section view of the float.

Fig. 3 is a transverse sectional view, taken on line 3—3, Fig. 1, and looking in the direction of the arrows.

Fig. 4 is a transverse sectional view, taken on line 4—4, Fig. 1, and looking in the direction of the arrows.

Fig. 5 is a view partly in side elevation and partly in longitudinal section of the float, showing it adapted for casting.

Fig. 6 is a transverse sectional view, taken on line 6—6, Fig. 5, looking in the direction of the arrows.

Referring to the drawing by numbers, 1 designates the elongated straight keel of the float and extending upwardly and entirely above the keel is the hull 2. The hull 2, has a top rib 3, which extends substantially the length of the entire hull. Sloping from opposite sides of rib 3 are flattened portions 4. The rear of the hull 2 is curved downwardly and forwardly at 5 and terminates at the rear edge of the keel portion, causing the float to resemble somewhat a sailboat when the float is in the water, in operation.

The straight keel 1, is provided on both ends with outwardly extending short cylindrical-shaped integral ears, 6. On these ears 6 are mounted preferably elastic or rubber bands 7. By reason of the cylindrical-shaped ears 6 the rubber bands 7 will not accidentally slip off. Also said bands 7 are well within the outer ends of said ears 6.

The hull 2 slopes generally rearwardly and upwardly and a portion thereof overhangs the projecting ear portion 6 of the keel.

In operation, for still fishing, the fishing line 8 is placed through the bands 7, and held securely against the bottom of the straight keel 1 throughout its entire length including said ears 6. It will therefore be seen that the operator can easily adjust the fishing line 8 so that the hook 9 may be spaced from the float any desired distance prior to placing the rubber bands 7 upon ears 6.

For casting, the fishing line 8 is threaded through the longitudinally extending aperture 10 and is provided with an adjustable stop 11 (Fig. 5). This stop 11 is desirable because the operator can gauge the depth that he wishes to have the hook to settle in the water, and by adjusting the stop 11 on the line, the operator can find just what is the best operable position.

Since my float extends upwardly, as shown in Figs. 1 and 5, twisting of the line has been substantially eliminated, and the float can be easily seen on the water while the fishing operation is being continued.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

As a new article of manufacture, a fishline float comprising a hull portion substantially wide in transverse cross section and provided on its bottom with a keel portion, said keel being adapted to be submerged in water when the device is in operation, said keel being provided on its bow and stern with projecting cylindrical shape ears, said keel and ears being provided with a straight common aperture, said hull slanting rearwardly and having a portion overhanging the stern cylindrical shaped ear, said hull having a top rib with flattened portions sloping therefrom at opposite sides, said hull being curved inwardly at its stern, and said inwardly curved portion terminating at the rear edge of said keel portion.

References Cited in the file of this patent

UNITED STATES PATENTS

| D. 165,581 | Harris | Jan. 1, 1952 |
| 1,795,205 | Fenderson | Mar. 3, 1931 |
| 2,251,721 | Shepherd | Aug. 5, 1941 |
| 2,571,808 | Aldinger | Oct. 16, 1951 |
| 2,587,311 | Golnick | Feb. 26, 1952 |
| 2,595,947 | Jones | May 6, 1952 |
| 2,683,325 | Sharp | July 13, 1954 |

FOREIGN PATENTS

| 70,941 | Norway | 1946 |
| 710,939 | Great Britain | June 23, 1954 |